US011611907B2

(12) United States Patent
Arslan et al.

(10) Patent No.: US 11,611,907 B2
(45) Date of Patent: *Mar. 21, 2023

(54) FAST SIGNAL IDENTIFICATION OF BLUETOOTH, ZIGBEE AND OTHER NETWORK PROTOCOLS

(71) Applicant: Silicon Laboratories Inc., Austin, TX (US)

(72) Inventors: Guner Arslan, Austin, TX (US); Yan Zhou, Spicewood, TX (US); He Gou, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/840,107

(22) Filed: Jun. 14, 2022

(65) Prior Publication Data
US 2022/0312271 A1    Sep. 29, 2022

Related U.S. Application Data

(63) Continuation of application No. 16/988,918, filed on Aug. 10, 2020, now Pat. No. 11,395,188.

(51) Int. Cl.
*H04W 28/14* (2009.01)
*H04W 4/80* (2018.01)
(Continued)

(52) U.S. Cl.
CPC ........... *H04W 28/14* (2013.01); *H04L 1/1685* (2013.01); *H04W 4/80* (2018.02);
(Continued)

(58) Field of Classification Search
CPC .............. H04L 1/1685; H04L 27/0012; H04L 27/0014; H04L 2027/0026; H04W 28/14;
(Continued)

(56) References Cited

U.S. PATENT DOCUMENTS 7,551,904 B2    6/2009  Lee et al.
7,639,047 B1 *  12/2009 Ang .......................... G06F 1/10
                                                             326/41
(Continued)

FOREIGN PATENT DOCUMENTS

CN        1358003 A     7/2002
CN      101132368 A     2/2008
(Continued)

OTHER PUBLICATIONS

"Single-Chip IEEE 802.11 b/g/n MAC/Baseband/Radio + SDIO," Data Sheet, Broadcom Corporation, 82 pages, Feb. 13, 2015.
(Continued)

*Primary Examiner* — Hassan A Phillips
*Assistant Examiner* — Hicham B Foud
(74) *Attorney, Agent, or Firm* — Nields, Lemack & Frame, LLC

(57) ABSTRACT

A system and method for detecting the presence of a Bluetooth or Zigbee signal within a short period of time is disclosed. The signal identification circuit has two stages, a first stage that processes windows to determine whether noise is present, and a second stage that processes long windows to determine whether the signal is a particular lower-power network protocol. The signal identification circuit can be configured to detect Bluetooth at 1 Mbps, Bluetooth at 2 Mbps or Zigbee. The signal identification signal may be used to allow a lower-power network controller to coexist with a high duty cycle WiFi controller. The signal identification circuit may also be used for other functions, such as powering on a lower-power network controller, determining CCA, or determining which channel a packet is being transmitted on.

22 Claims, 11 Drawing Sheets

(51) Int. Cl.
  *H04L 1/16* (2023.01)
  *H04W 72/14* (2009.01)
  *H04W 72/12* (2023.01)
  *H04W 88/06* (2009.01)
  *H04W 84/12* (2009.01)
  *H04L 1/1607* (2023.01)

(52) U.S. Cl.
  CPC ....... *H04W 72/1215* (2013.01); *H04W 72/14* (2013.01); *H04W 84/12* (2013.01); *H04W 88/06* (2013.01)

(58) Field of Classification Search
  CPC ... H04W 4/80; H04W 72/1215; H04W 72/14; H04W 84/12; H04W 88/06; H04W 84/18; H04W 24/08; Y02D 30/70
  See application file for complete search history.

(56) References Cited

U.S. PATENT DOCUMENTS

| | | |
|---|---|---|
| 9,106,485 B1 | 8/2015 | Waheed et al. |
| 9,729,364 B1 | 8/2017 | Rey |
| 9,980,277 B2 | 5/2018 | Dickey et al. |
| 10,014,633 B1 * | 7/2018 | Choi .................... F02M 51/005 |
| 10,278,200 B2 | 4/2019 | Dickey et al. |
| 10,342,028 B2 | 7/2019 | Dickey et al. |
| 10,667,285 B2 | 5/2020 | Dickey et al. |
| 10,764,097 B1 | 9/2020 | Rey |
| 11,184,272 B2 | 11/2021 | Zhou et al. |
| 11,395,188 B2 | 7/2022 | Arslan et al. |
| 11,452,110 B1 * | 9/2022 | Jorgovanovic ........ H04W 72/02 |
| 2001/0026598 A1 | 10/2001 | Porcino |
| 2002/0141506 A1 | 10/2002 | Chen |
| 2005/0063416 A1 | 3/2005 | Shin et al. |
| 2006/0015503 A1 * | 1/2006 | Simons .................. H04L 67/52 |
| 2008/0043705 A1 | 2/2008 | Desai et al. |
| 2008/0287158 A1 | 11/2008 | Rayzman et al. |
| 2009/0137206 A1 | 5/2009 | Sherman et al. |
| 2009/0176454 A1 | 7/2009 | Chen et al. |
| 2009/0247217 A1 | 10/2009 | Hsu et al. |
| 2009/0258612 A1 | 10/2009 | Zhuang et al. |
| 2009/0291658 A1 | 11/2009 | Castle |
| 2010/0322159 A1 | 12/2010 | Ko et al. |
| 2011/0169659 A1 | 7/2011 | Dalla et al. |
| 2011/0268024 A1 | 11/2011 | Jamp et al. |
| 2011/0268051 A1 | 11/2011 | Tsao et al. |
| 2011/0310741 A1 | 12/2011 | Ko et al. |
| 2013/0007480 A1 | 1/2013 | Wertheimer et al. |
| 2013/0058316 A1 | 3/2013 | Hirsch et al. |
| 2013/0121329 A1 | 5/2013 | Desai et al. |
| 2013/0177043 A1 | 7/2013 | Wyper et al. |
| 2013/0225100 A1 | 8/2013 | Chen et al. |
| 2014/0050204 A1 | 2/2014 | Huang et al. |
| 2014/0254634 A1 | 9/2014 | Hsu et al. |
| 2015/0012584 A1 | 1/2015 | Lo et al. |
| 2015/0036725 A1 | 2/2015 | Chen |
| 2015/0109984 A1 | 4/2015 | Huang et al. |
| 2015/0200692 A1 | 7/2015 | Chiou et al. |
| 2015/0245372 A1 | 8/2015 | Desai et al. |
| 2015/0341078 A1 | 11/2015 | Lingam et al. |
| 2016/0234696 A1 | 8/2016 | Looker et al. |
| 2016/0365885 A1 | 12/2016 | Honjo et al. |
| 2016/0381581 A1 | 12/2016 | Stanciu et al. |
| 2017/0188182 A1 | 6/2017 | Jin et al. |
| 2017/0288922 A1 | 10/2017 | Akhavan et al. |
| 2017/0288932 A1 | 10/2017 | Kang et al. |
| 2017/0290035 A1 | 10/2017 | Dickey et al. |
| 2017/0290038 A1 | 10/2017 | Dickey et al. |
| 2017/0324595 A1 | 11/2017 | Qiu et al. |
| 2017/0325252 A1 * | 11/2017 | Dickey .................. H04W 72/14 |
| 2017/0373893 A1 | 12/2017 | Rey |
| 2018/0242341 A1 | 8/2018 | Dickey et al. |
| 2018/0352055 A1 | 12/2018 | He et al. |
| 2020/0007366 A1 | 1/2020 | Gilbert |
| 2020/0195544 A1 * | 6/2020 | Zhou .................... H04L 27/106 |
| 2022/0046476 A1 | 2/2022 | Arslan et al. |

FOREIGN PATENT DOCUMENTS

| | | |
|---|---|---|
| CN | 101547028 A | 9/2009 |
| CN | 102487609 A | 6/2012 |
| DE | 102009037528 A1 | 1/2011 |

OTHER PUBLICATIONS

"IEEE Standards 802.15.2 Part 15.2: Coexistence of Wireless Personal Area Networks with Other Wireless Devices Operating in Unlicensed Frequency Bands," IEEE Computer Society, 115 pages, Aug. 28, 2003.

"AR6102 Wi-Fi solution designed for portable consumer electronics devices," Qualcomm, 3 pages, 2013.

Chinese communication, with English translation, dated May 29, 2020 in co-pending Chinese patent application No. 201710196693.X.

German communication, with English translation, dated Jul. 5, 2021 in co-pending German patent application No. 102016125901.2.

* cited by examiner

| DATA SYMBOL (DECIMAL) | DATA SYMBOL (BINARY) ($b_0 b_1 b_2 b_3$) | CHIP VALUES ($c_0 c_1 c_2 \ldots c_{29} c_{30} c_{31}$) |
|---|---|---|
| 0 | 0000 | 11011001110000110101001000101110 |
| 1 | 1000 | 11101101100111000011010100100010 |
| 2 | 0100 | 00101110110110011100001101010010 |
| 3 | 1100 | 00100010111011011001110000110101 |
| 4 | 0010 | 01010010001011101101100111000011 |
| 5 | 1010 | 00110101001000101110110110011100 |
| 6 | 0110 | 11000011010100100010111011011001 |
| 7 | 1110 | 10011100001101010010001011101101 |
| 8 | 0001 | 10001100100101100000011101111011 |
| 9 | 1001 | 10111000110010010110000001110111 |
| 10 | 0101 | 01111011100011001001011000000111 |
| 11 | 1101 | 01110111101110001100100101100000 |
| 12 | 0011 | 00000111011110111000110010010110 |
| 13 | 1011 | 01100000011101111011100011001001 |
| 14 | 0111 | 10010110000001110111101110001100 |
| 15 | 1111 | 11001001011000000111011110111000 |

FIG. 8

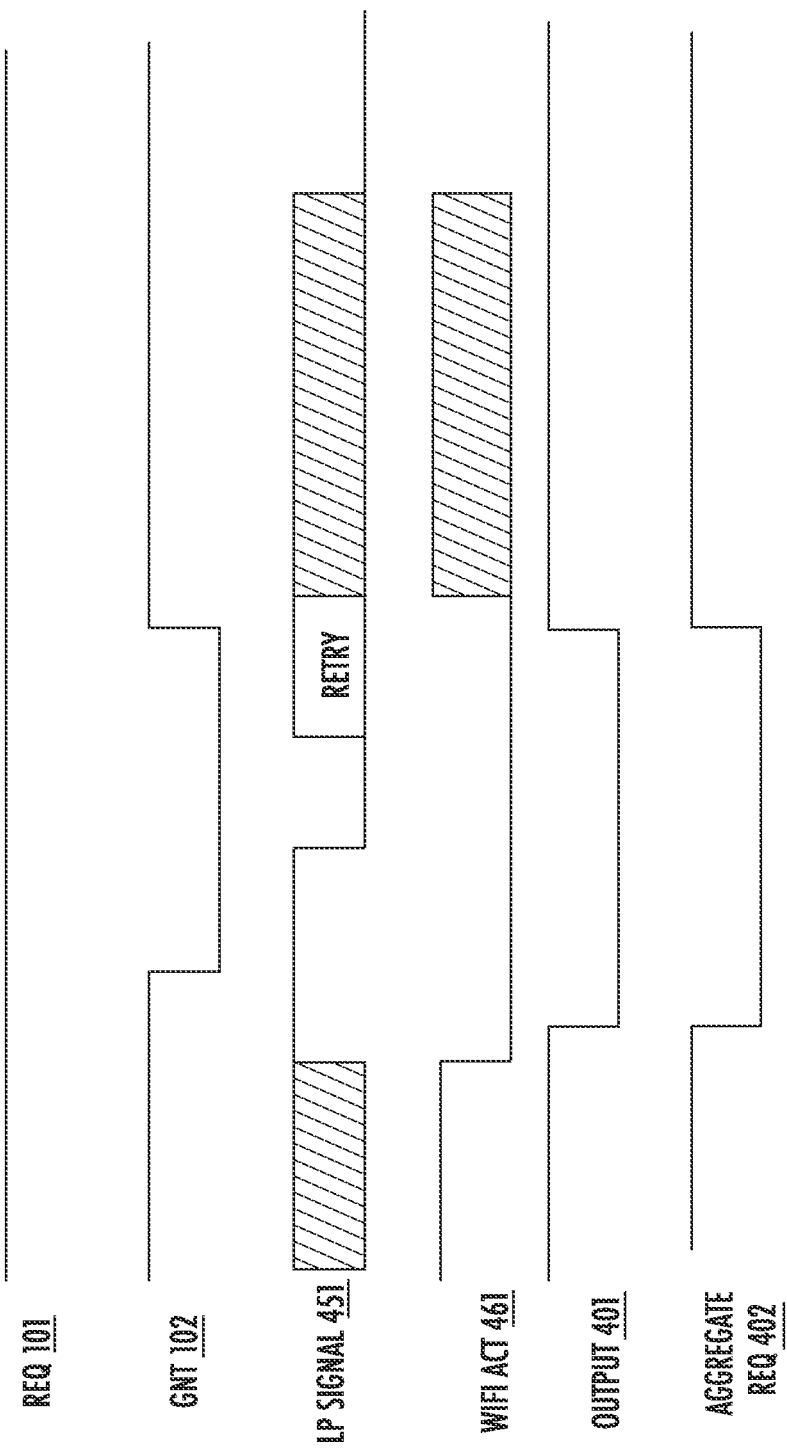

FAST SIGNAL IDENTIFICATION OF BLUETOOTH, ZIGBEE AND OTHER NETWORK PROTOCOLS

This application is a continuation of U.S. patent application Ser. No. 16/988,918, filed Aug. 10, 2020, the disclosure of which is incorporated herein by reference in its entirety.

FIELD

This disclosure describes systems and methods allowing the detection and co-existence of multiple network protocols in close proximity to one another, and more specifically, the detection of ZigBee or Bluetooth, such as in a WiFi environment.

BACKGROUND

The proliferation of networks, especially in the 2.4 GHz frequency band, has led to challenges for those attempting to utilize multiple network protocols. For example, ZigBee and BlueTooth Low Energy (BLE) all operate in the 2.4 GHz spectrum, and are considered low power protocols. However, WiFi, which has much higher transmission power levels, also operates in this frequency spectrum. Consequently, these various protocols may interfere with one another, resulting in reductions in throughput or data loss.

However, currently, most solutions to this problem are unmanaged, meaning that customers are asked to maximize RF isolation. This may be done by attempting to physically separate the antennas associated with each network protocol. Alternatively or additionally, the networks may be set up on separate channels within the 2.4 GHz frequency spectrum to attempt to reduce isolation requirements. Finally, the number of retries allowed for each network protocol may be maximized, thereby using retransmissions to serve as a safety net in case the other techniques do not yield the required RF isolation.

In addition, recent market trends are to reduce the space required to implement these various protocols. One way of doing this is to co-locate multiple antennas within a single device. For example, gateways and other devices that include WiFi and one or more other network protocols are becoming increasingly popular.

The unmanaged approaches that are currently used are insufficient to address these issues associated with co-existence of multiple network protocols. Therefore, there is a need for a more managed and planned approach to co-located networks which operate in the same frequency spectrum. Specifically, this is a need to detect the presence of a low power network protocol during the "off" times of the WiFi network. Additionally, the ability to quickly detect the presence of a low power network protocol may have other uses.

SUMMARY

A system and method for detecting the presence of a Bluetooth or Zigbee signal within a short period of time is disclosed. The signal identification circuit may have two stages, a first stage that processes windows to determine whether a signal is present, and a second stage that processes long windows to determine whether the signal is a particular lower-power network protocol. The signal identification circuit can be configured to detect Bluetooth at 1 Mbps, Bluetooth at 2 Mbps or Zigbee. The signal identification signal may be used to allow a lower-power network controller to coexist with a high duty cycle WiFi controller. The signal identification circuit may also be used for other functions, such as powering on a lower-power network controller, determining Clear Channel Assessment, or determining which channel a packet is being transmitted on.

According to one embodiment, a signal identification circuit to determine whether a wireless signal comprises a particular lower-power network protocol is disclosed. The circuit comprises a circuit configured to: receive a plurality of data points in a buffer, wherein each data point represents a frequency value; select a first group of the plurality of datapoints from the buffer, referred to as a long window; determine whether a lower-power network signal is present in the long window based on the frequency value of each data point; if the lower-power network signal is present, perform a timing lock on the long window to create an optimized data buffer; perform a super symbol frequency deviation check on the optimized data buffer; and optionally perform a Zigbee chip correlation on the optimized data buffer; and, based on results of the timing lock, the super symbol frequency deviation check and the Zigbee chip correlation, the circuit determines whether the particular lower-power network protocol is present. In certain embodiments, the super symbol frequency deviation check and the optional Zigbee chip correlation are performed a plurality of times, and the circuit selects a new group from the buffer to create a new long window, wherein the new group comprises removing one or more earliest received data points and adding an equal number of more recently received data points. In some embodiments, performing the timing lock comprises: determining an optimal phase of a bit clock that best represents the actual transmitted bits; and sampling the window using the optimal phase to create the optimized data buffer. In certain embodiments, the optimal phase is determined by separating the data points into a plurality of bins, and wherein one bin is selected as the optimal phase. In some embodiments, the bin with the greatest difference between average positive frequency values and average negative frequency values determines the optimal phase. In some embodiments, the bin with the greatest sum of absolute values of all data points determines the optimal phase. In certain embodiments, data points having a frequency outside an expected range are referred to as frequency outliers, and frequency outliers are modified prior to a selection of the optimal phase. In certain embodiments, performing a super symbol frequency deviation check on the optimized data buffer comprises: counting a number of bits in the optimized data buffer that are not within a predetermined range of values, wherein expected values are based on a frequency deviation used by the lower-power network protocol and the predetermined range is defined as the expected value+/−a margin; and indicating success if the number of bits is less than a threshold. In some embodiments, performing a Zigbee chip correlation comprises: comparing the optimized data buffer to valid Zigbee chip sequences; and incrementing a counter if a correlation is found. In certain embodiments, the particular lower-power network protocols are selected from the group consisting of Zigbee, BLE at 2 Mbps and BLE at 1 Mbps. In some embodiments, determining whether a lower-power network signal is present in the long window based on the frequency value of each data point, comprises: counting a number of data points having a frequency outside an expected range are referred to as frequency outliers, and if the number is less than a predetermined value, indicating that a lower-power network signal is present. In some embodiments, determining whether a lower-power network signal is present in the long window based on the frequency value of each data point, comprises: counting a number of data points having a frequency value having an opposite sign as an adjacent data point, referred to as zero-crossings, and if a number of zero-crossings is less than a predetermined value, indicating that a lower-power network signal is present. In certain embodiments, the signal identification circuit comprises an additional circuit, wherein the additional circuit comprises a first stage of the signal identification circuit and the circuit comprises a second stage, and where the circuit only performs the timing lock, the super symbol frequency deviation check and the Zigbee chip correlation if the first stage determines the wireless signal may be a lower-power network protocol. In certain embodiments, the first stage is configured to: collect a first plurality of data points, referred to as a window; determine whether a lower-power network signal is present in the window based on the frequency value of each data point; if so: save the plurality of data points in the window in the buffer; increment a window counter; and repeat the collect and determine steps until the window counter is greater than a predetermined upper limit; if not: determine if the window counter is greater to a predetermined lower limit; and if so, execute the second stage; and if not: reset the window counter; clear the buffer; and repeat the collect and determine steps.

According to another embodiment, a system is disclosed. The system comprises a WiFi controller, comprising an aggregate request signal used as an input to request exclusive access to a shared medium and a grant signal used as an output indicating that the exclusive access to the shared medium has been granted; a lower-power network controller, comprising a processing unit and an associated memory element, wherein the lower-power network controller is configured to assert a request signal if an incoming lower-power network packet is destined for this controller or if an outgoing lower-power network packet is to be transmitted; and the signal identification circuit described above, wherein the signal identification circuit is used to request access to the shared medium from the WiFi controller.

According to another embodiment, a method of determining whether a wireless signal comprises a particular lower-power network protocol is disclosed. The method comprises collecting a first plurality of data points, referred to as a window; determining whether a lower-power network signal is present in the window based on the frequency value of each data point; if so: saving the plurality of data points in the window in a buffer; incrementing a window counter; and repeating the collecting and determining steps until the window counter is greater than a predetermined upper limit; if not: determining if the window counter is greater to a predetermined lower limit; and if so, executing a second stage; and if not: resetting the window counter; clearing the buffer; and repeating the collecting and determining steps; and wherein the second stage comprises: selecting a first group of the plurality of datapoints from the buffer, referred to as a long window; determining whether a lower-power network signal is present in the long window based on the frequency value of each data point; if the lower-power network signal is present, performing a timing lock on the long window to create an optimized data buffer; performing a super symbol frequency deviation check on the optimized data buffer; optionally performing a Zigbee chip correlation on the optimized data buffer; and, based on results of the timing lock, the super symbol frequency deviation check and the Zigbee chip correlation, determining whether the particular lower-power network protocol is present. In certain embodiments, performing the timing lock comprises: determining an optimal phase of a bit clock that best represents the actual transmitted bits; and sampling the data points in the long window using the optimal phase to create the optimized data buffer. In one embodiment, the optimal phase is determined by separating the data points into a plurality of bins, and wherein one bin is selected as the optimal phase. In one embodiment, performing a super symbol frequency deviation check on the optimized data buffer comprises: counting a number of bits in the optimized data buffer that are not within a predetermined range of values, wherein expected values are based on a frequency deviation used by the lower-power network protocol and the predetermined range is defined as the expected value+/−a margin; and indicating success if the number of bits is less than a threshold. In some embodiments, performing a Zigbee chip correlation comprises: comparing the optimized data buffer to valid Zigbee chip sequences; and incrementing a counter if a correlation is found.

BRIEF DESCRIPTION OF THE DRAWINGS

For a better understanding of the present disclosure, reference is made to the accompanying drawings, in which like elements are referenced with like numerals, and in which:

FIG. 8 shows the chip values used by the Zigbee network protocol;

FIGS. 9A-9B are timing diagrams representing different scenarios using the system of FIG. 4.

DETAILED DESCRIPTION

Figure 1:
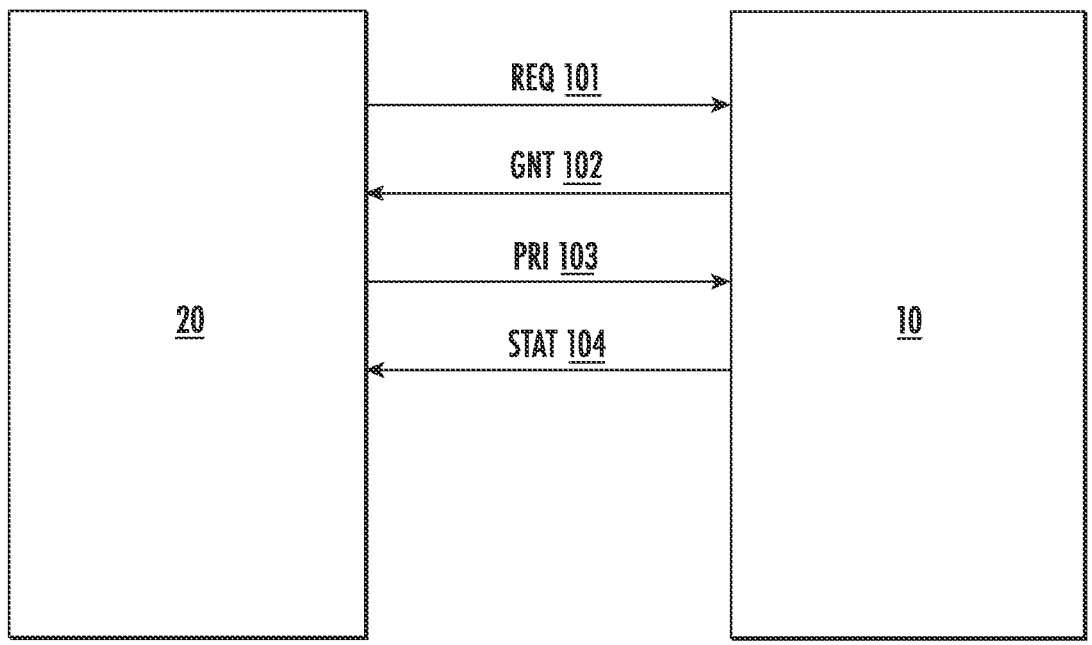
FIG. 1 is a block diagram of a system having both a WiFi controller and a lower-power network controller.

FIG. 1 shows a block diagram of a system having a WiFi network controller and a lower-power network controller. Throughout this disclosure, the term "lower-power network" is used to refer to any network protocol that operates in the same frequency spectrum as the WiFi network, and uses lower power. For example, ZIGBEE®, Bluetooth®, and Bluetooth Low Energy (BLE) all operate in the same 2.4 GHz frequency spectrum as WiFi. Other network protocols layered on IEEE 802.15.4 would also operate in the 2.4 GHz frequency spectrum. Further, although reference is made throughout this disclosure to 2.4 GHz, it is understood that the techniques and systems described herein are applicable to any frequency spectrum where both high power devices and lower power network co-exist.

FIG. 1 shows a WiFi controller 10 and a lower-power network controller 20. While FIG. 1 shows these devices as being two separate devices, it is understood that in certain embodiments, these devices may be incorporated into a single integrated circuit. Thus, FIG. 1 illustrates the interface between these components, regardless of the physical implementation of these components.

Within the IEEE 802.15.2 standard, an arbitration mechanism is defined. This mechanism, known as Packet Traffic Arbitration (PTA), allows other lower-power network controllers to request access to the shared medium from the WiFi controller. The shared medium is typically the air. The mechanism includes a request signal (REQ) 101 which in an indication from the lower-power network controller 20 that it wishes to access the shared medium. The protocol also includes a grant signal (GNT) 102, indicating that the WiFi controller 10 has allowed another device to use the shared medium. In certain embodiments, the mechanism includes a priority signal (PRI) 103, which is used to indicate the importance of the packet that the lower-power network controller 20 wishes to transmit. Finally, in certain embodiments, the mechanism includes a status signal (STAT) 104, which indicates the status of the WiFi controller 10. In certain embodiments, this STAT signal 104 may be asserted when the WiFi controller 10 is receiving a packet and deasserted at all other times. In other embodiments, the STAT signal 104 may be asserted whenever the WiFi controller 10 is transmitting or receiving.

Further, while FIG. 1 shows the arbitration logic contained within the WiFi controller, other embodiments are also possible. For example, the packet arbitration logic may be a separate component, separate from the lower-power network controller 20 and the WiFi controller 10.

Traditionally, the lower-power network controller 20 asserts the REQ signal 101 whenever it wishes to transmit a packet over the shared medium. In response, the WiFi controller 10 asserts the GNT signal 102 when it is no longer active. After the lower-power network controller 20 has completed transmitting its packet, it then deasserts the REQ signal 101, indicating that it no longer needs access to the shared medium. The WiFi controller 10 then deasserts the GNT signal 102.

However, this mechanism has drawbacks. For example, if the lower-power network controller 20 is receiving a packet, and the WiFi controller 10 begins transmission of a new packet during that reception, it is likely that the packet being received by the lower-power network controller 20 will be corrupted. Further, even if the incoming packet is not corrupted, the lower-power network controller 20 will be unable to transmit an acknowledgement (ACK) back to the transmitting node. Consequently, even if the lower-power network packet were successfully received, it will be treated as a failure and retries will be incurred.

In certain embodiments, the present disclosure proposes a unique usage of the PTA mechanism to reduce retries and interference, with minimal impact on WiFi performance.

Figure 2:
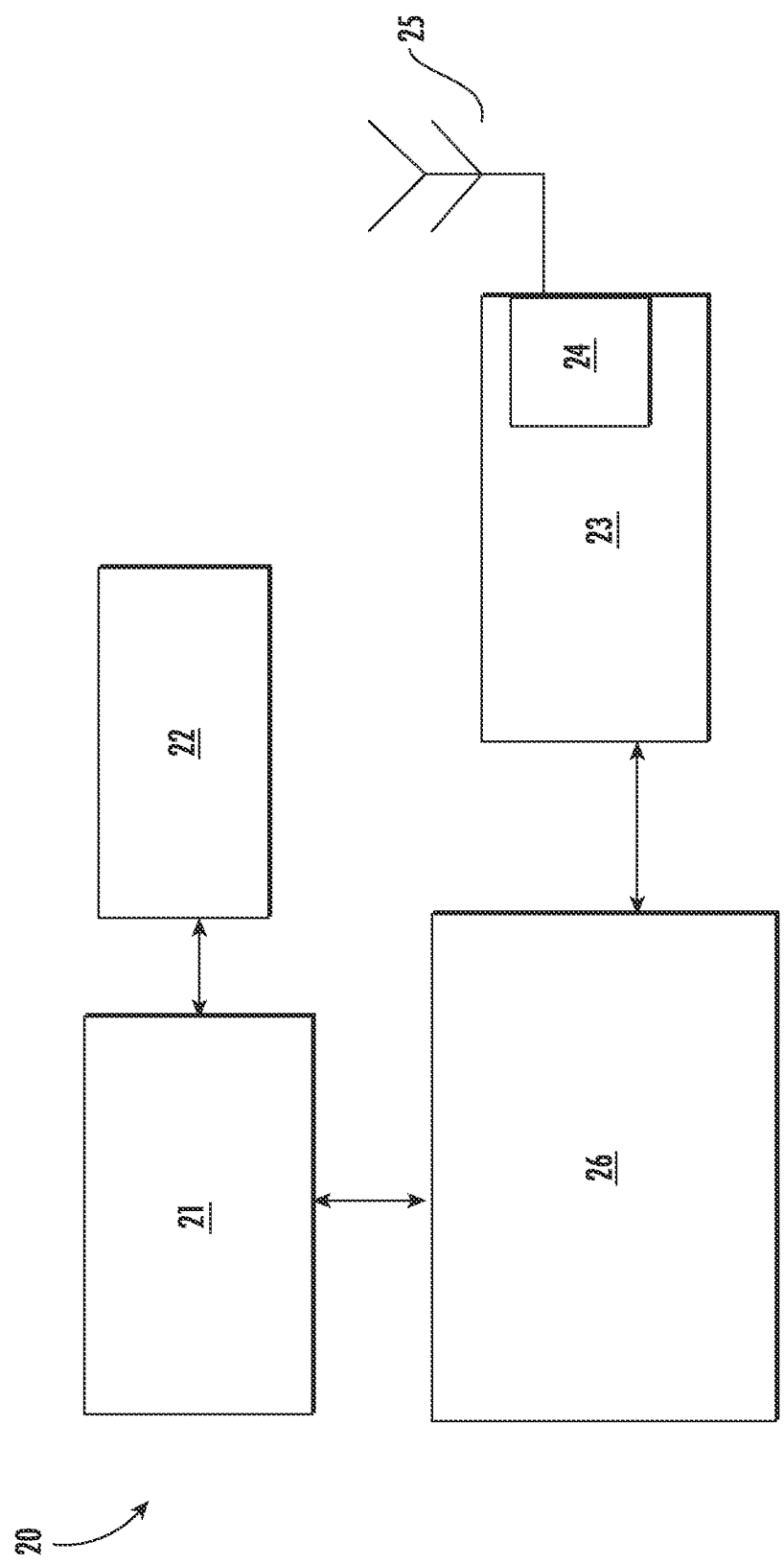
FIG. 2 is a block diagram of the lower-power network controller.

FIG. 2 shows a block diagram of a representative lower-power network controller 20. The lower-power network controller 20 has a processing unit 21 and an associated memory device 22. This memory device 22 contains the instructions, which, when executed by the processing unit, enable the lower-power network controller 20 to perform the functions described herein. This memory device 22 may be a non-volatile memory, such as a FLASH ROM, an electrically erasable ROM or other suitable devices. In other embodiments, the memory device 22 may be a volatile memory, such as a RAM or DRAM. The lower-power network controller 20 also includes a network interface 23, which is typically a wireless interface including an antenna 25. The wireless interface may contain a sync detector for detecting the presence of a sync character in an incoming packet. Additionally, the network interface may comprise a radio 24, which includes the baseband processing and MAC level processing. The lower-power network controller 20 may include a second memory device 26 in which data that is received by the network interface 23, and data that is to be transmitted by the network interface 23, is stored. This second memory device 26 is traditionally a volatile memory. The processing unit 21 has the ability to read and write the second memory device 26 so as to communicate with the other nodes in the network. Although not shown, each lower-power network controller 20 also has a power supply, which may be a battery or a connection to a permanent power source, such as a wall outlet.

Figure 3:
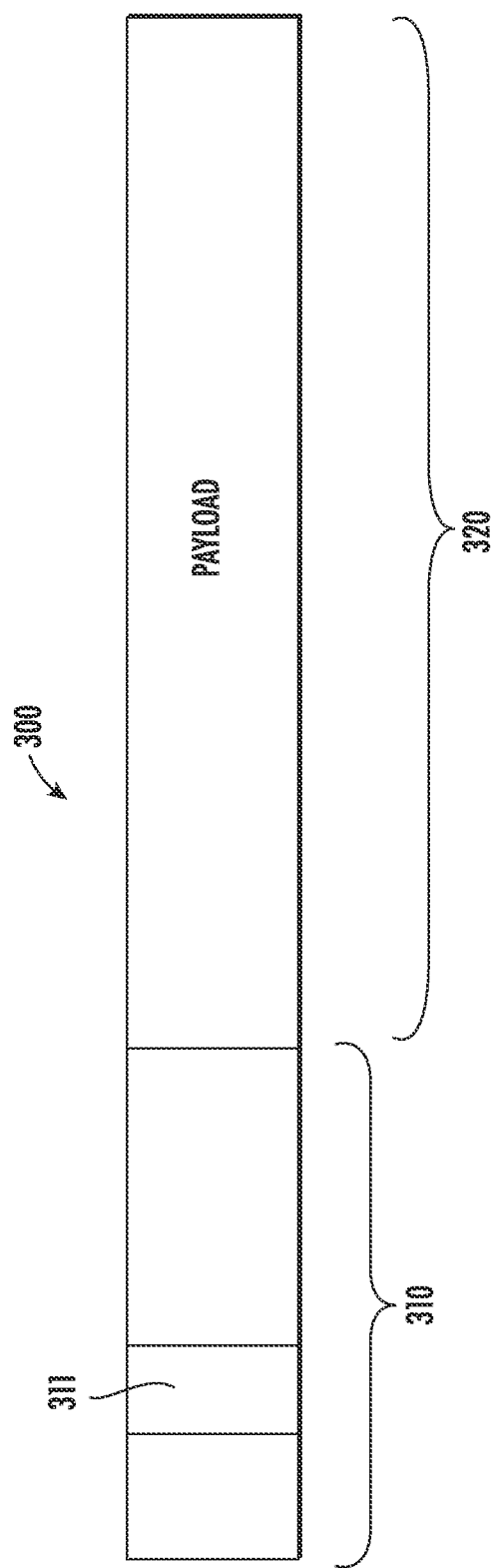
FIG. 3 is a representative lower-power network packet.

FIG. 3 shows a typical incoming packet from a lower-power network. The lower-power network packet 300 includes a header 310 and a payload 320. The header 310 may further include a destination address 311. The destination address 311 is a representation of the device to which this packet is intended. For example, each lower-power network device may have a unique network identifier, which is used as the destination address. The header 310 may also include other fields, and the disclosure does not limit the other components which comprise the header.

The above configuration allows coexistence between the WiFi controller 10 and a lower-power network controller 20. However, there may be instances where this configuration operates in a suboptimal manner. For example, assume that the WiFi controller 10 is operating at a very high duty cycle, such that it monopolizes or nearly monopolizes the shared medium.

According to the IEEE802.11 protocol, there are periods of time where no WiFi devices are supposed to be transmitting, known as interframe spacing. The shortest of these interframe spacings may be about 16 psec. During these periods, it may be possible to detect that a lower-power network protocol signal is present on the shared media. However, it is unlikely that during this time period, the header 310, which includes preamble and sync fields, of the lower-power network packet are being transmitted. Rather, it is more likely that the data portion of the lower-power network packet is being transmitted. Therefore, it is likely that it is not possible for the sync detector of the lower-power network controller 20 to determine the existence of this lower-power network packet.

In other words, if a lower-power network packet is being transmitted to this device, but the preamble and sync fields is not transmitted during the interframe spacing, the lower-power network controller 20 will not attempt to gain access to the shared media to receive the packet. Consequently, that incoming lower-power packet will not be recognized and will not be received by the lower-power network controller 20. During periods of very high WiFi activity, it may not be possible to receive this incoming packet.

Figure 4:
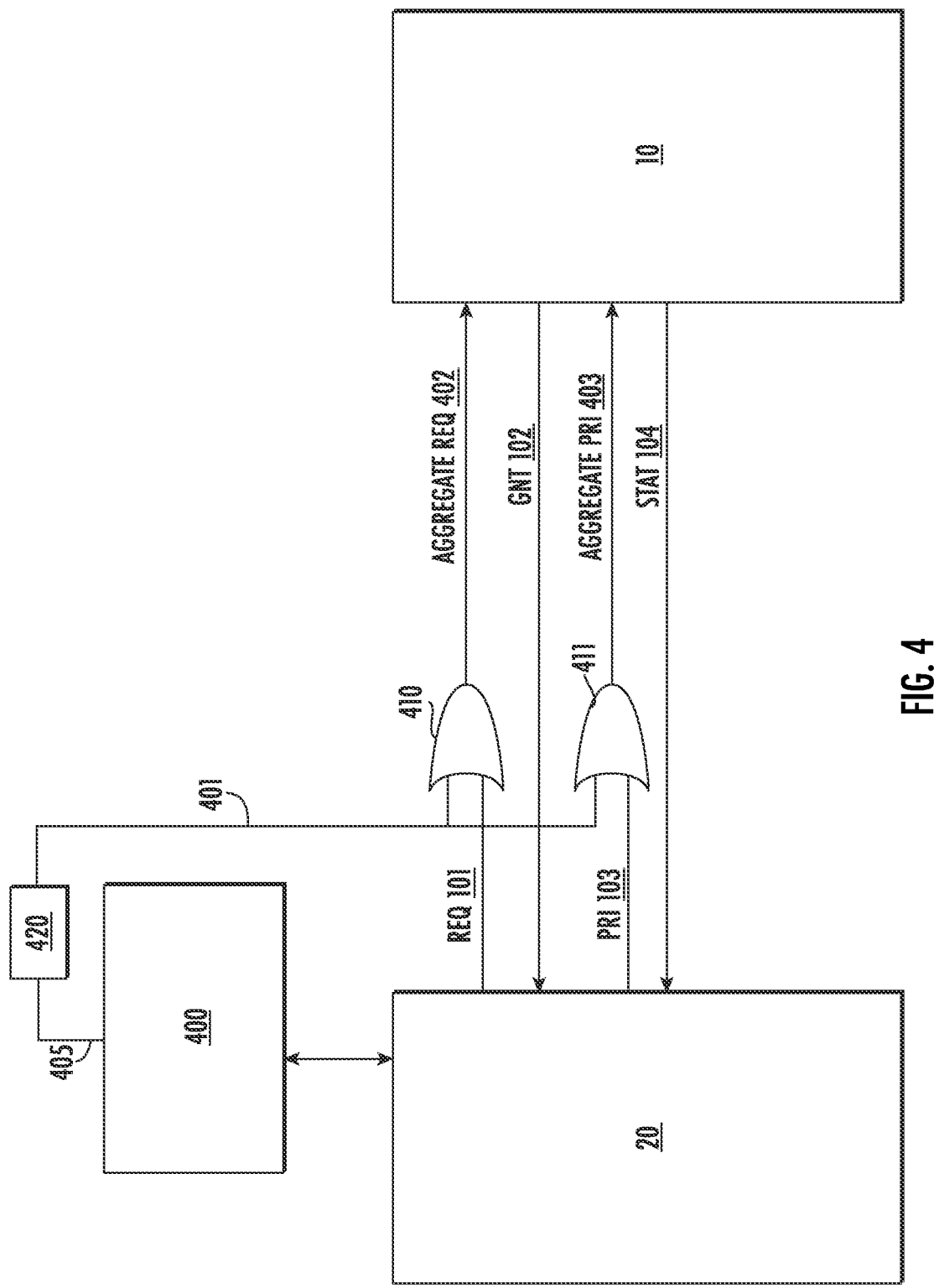
FIG. 4 is a block diagram of a system having both a WiFi controller and a lower-power network controller according to a second embodiment.

FIG. 4 shows a configuration that addresses this issue. FIG. 4 shows the WiFi controller 10, the lower-power network controller 20 and a signal identification circuit 400. While FIG. 4 shows these devices as being separate devices, it is understood that in certain embodiments, two or more of these devices may be incorporated into a single integrated circuit. For example, parts of the signal identification circuit 400 may be incorporated in the lower-power network controller 20. Thus, FIG. 4 illustrates the interface between these components, regardless of the physical implementation of these components.

As explained above, Packet Traffic Arbitration (PTA) includes a request signal (REQ) 101 which in an indication from the lower-power network controller 20 that it wishes to access the shared medium. The protocol also includes a grant signal (GNT) 102, indicating that the WiFi controller 10 has allowed another device to use the shared medium. In certain embodiments, the mechanism includes a priority signal (PRI) 103, which is used to indicate the importance of the packet that the lower-power network controller 20 wishes to transmit. Finally, in certain embodiments, the mechanism includes a status signal (STAT) 104, which indicates the status of the WiFi controller 10. In certain embodiments, this STAT signal 104 may be asserted when the WiFi controller 10 is receiving a packet and deasserted at all other times. In other embodiments, the STAT signal 104 may be asserted whenever the WiFi controller 10 is transmitting or receiving.

Further, while FIG. 4 shows the arbitration logic contained within the WiFi controller, other embodiments are also possible. For example, the packet arbitration logic may be a separate component, separate from the lower-power network controller 20 and the WiFi controller 10.

As stated above, FIG. 4 shows a signal identification circuit 400. This signal identification circuit 400 includes an output 405 which indicates that the desired signal has been detected. In certain embodiments, the signal identification circuit 400 may be incorporated into the lower-power network controller 20.

In certain embodiments, this output 405 is in communication with a timer 420. The output 401 of the timer 420 is intended to be another REQ signal. The assertion of output 405 causes the output 401 to be asserted. The output 401 stays asserted for a period of time, as described below. This output 401 is logically OR'ed with the REQ signal 101 using OR gate 410, so as to create an aggregate REQ signal 402 which is supplied to the WiFi controller 10. Similarly, the output 401 may be logically OR'ed with the PRI signal 103 using OR gate 411 to create an aggregate PRI signal 403. In this way, either the lower-power network controller 20 or the signal identification circuit 400 may assert the aggregate REQ signal 402 and the aggregate PRI signal 403. While FIG. 4 shows OR gates 410, 411, it is understood that for active low logic, these gates would be AND gates. FIG. 4 is simply meant to illustrate that the outputs of the two functions are combined to create an aggregate signal, such that whenever either output is asserted, the aggregate signal is asserted. In certain embodiments, the signal identification circuit 400 comprises a dedicated processing unit, such as an embedded controller, a special purpose processor or an embedded microprocessor. In those embodiments, the signal identification circuit 400 may also contain a memory device containing instructions that are executed by that dedicated processing unit. In another embodiment, the processing unit 21 in the lower power network controller 20 may communicate with the signal identification circuit 400 to perform at least some of the processes described herein.

In yet other embodiments, the signal identification circuit 400 may include a hardware state machine that performs the operations described herein. In all embodiments, the signal identification circuit 400, either alone or in communication with a separate processing unit perform some or all of the operations described herein. The signal identification circuit 400 may also include comparators, shift registers, counters and other storage elements as described below.

Additionally, FIG. 4 shows that the output 405 of the signal identification circuit 400 being used by a timer 420 to create the Aggregate REQ signal 402. However, in other embodiments, the output 401 may serve as an interrupt to the processing unit 21, as described below.

The signal identification circuit 400 receives its inputs from the lower power network interface 23. In one embodiment, the signal identification circuit 400 receives the inphase (I) and quadrature (Q) signals that are created in the lower power network interface 23. The signal identification circuit 400 then creates a plurality of data points, where each data point is a frequency value. In another embodiment, the signal identification circuit receives these data points directly from the lower power network interface 23. In this embodiment, the CORDIC in the lower power network interface 23 may be used to compute the phase value of each sample. These phase values are then used to create the frequency values, as described in more detail below.

The signal identification circuit 400 is used to detect the presence of a lower-power network signal on the shared medium. Specifically, in certain embodiments, the signal identification circuit 400 may be configured to recognize Bluetooth transmitted at 1 Mbps, referred to as BLE1, Bluetooth transmitted at 2 Mbps, referred to as BLE2, or Zigbee signals. The selection of which signal is to be detected affects the selection of various parameters within the signal identification circuit 400, as described in more detail below. The signal identification circuit 400 may comprise two stages. The first stage is used to analyze small windows of time and determine whether a lower-power network signal may be present. The second stage is actuated if the first stage indicates that a lower-power network signal may be present. The second stage analyzes a larger sliding window to determine whether there is indeed a lower-power network signal, and if so, whether that lower-power network signal is the expected Bluetooth or Zigbee signal. In noted above, these two stages may be implemented in hardware, software or a combination.

Note that while the following disclosure describes a two stage signal identification circuit, in other embodiments, the signal identification circuit may be constructed using a single stage or more than two stages. Therefore, the signal identification circuit 400 is not limited to the two stage architecture described herein.

Figure 5:
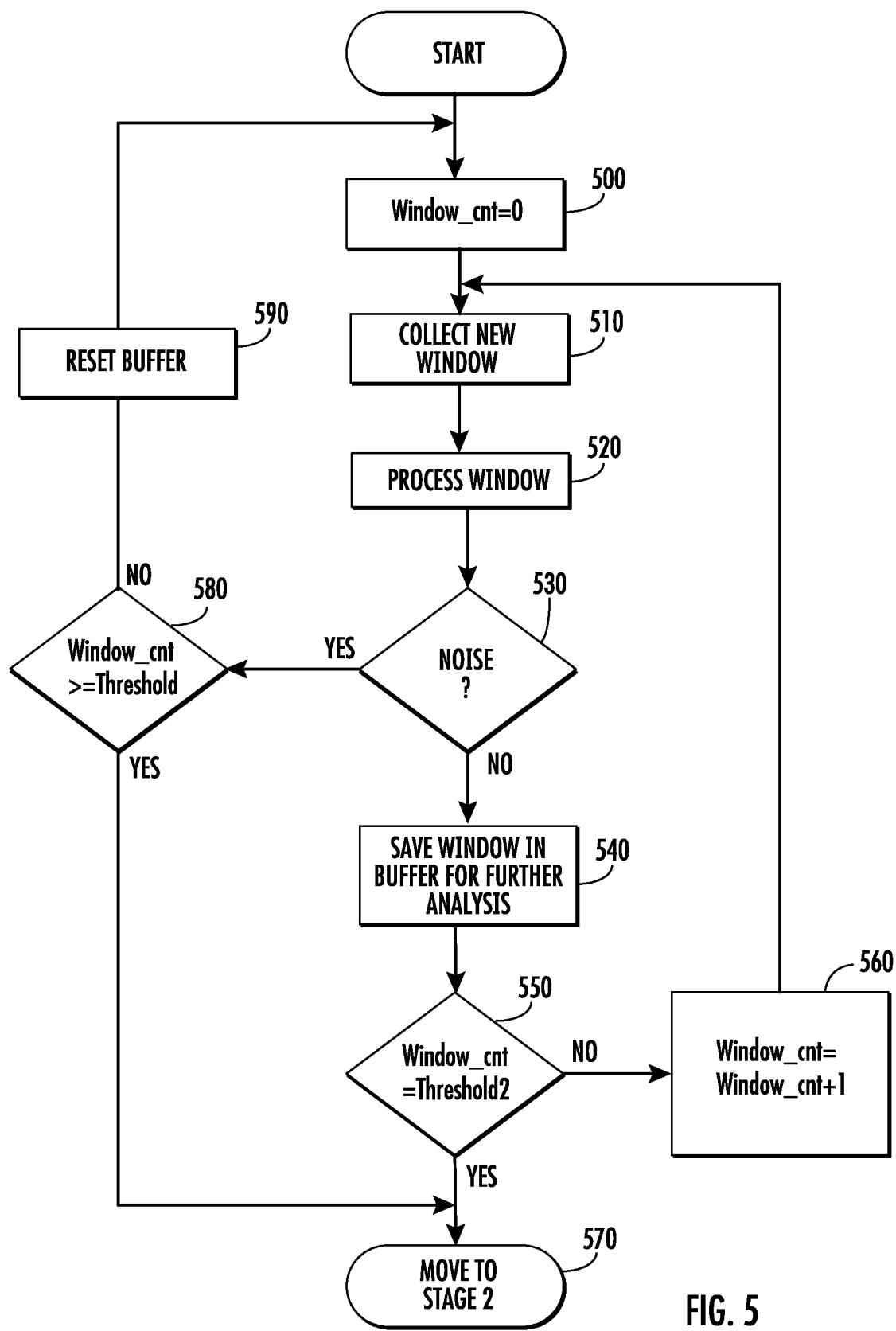
FIG. 5 is a representative flowchart of the first stage of the signal identification circuit.

FIG. 5 shows a representative flowchart showing the operation of the first stage of the signal identification circuit 400. This first stage attempts to identify a plurality of consecutive windows that are not noise. First, as shown in Process 500, the number of consecutive noiseless windows, also referred to as the window count (window_cnt) is set to zero. Next, the signal identification circuit 400 collects a new window. In certain embodiments, the duration of a window may be defined as 4 μseconds of data. In certain embodiments, the duration of a window may be defined as 8 μseconds of data. In one embodiment, the signal identification circuit 400 is capable of detecting either Zigbee, BLE at 2 Mbit/sec, referred to as BLE2 in this disclosure, and BLE at 1 Mbit/sec, referred to as BLE1 in this disclosure. In this embodiment, the duration of the window may be defined as a one value for Zigbee and BLE2 and may be defined as twice that value for BLE1. In one specific embodiment, the duration of the window is 4 μseconds for Zigbee and BLE2 and 8 μseconds for BLE1.

Next, as shown in Process 510, a window of data is collected. As is well known, the input waveforms are converted to inphase (I) and quadrature (Q) signals by the network interface 23. Thus, in one embodiment, the signal identification circuit 400 may be in communication with the network interface 23 of the lower power network controller 20 to obtain the incoming I and Q signals. In another embodiment, the network interface 23 includes a CORDIC which computes phase and uses the phase to determine frequency values.

The incoming signal received from the lower power network interface 23 is oversampled. This implies that multiple samples are taken for each possible bit of data. For example, if the maximum data rate is 2 Mbps, an oversample rate of 8 MHz (four times oversampling) or 10 MHz (5 times oversampling) may be used. The oversample rate may be dependent on which signal the signal identification circuit 400 is configured to recognize. For example, 5 times oversampling may be used for Zigbee, while 4 times oversampling may be used for BLE2 and BLE1. The I and Q signals then enter a CORDIC (Coordination Rotation Digital Computer), which determines the amplitude and phase of the signals. Amplitude is given as the square root of $I^2$ and $Q^2$, while phase is given by the $\tan^{-1}$ (Q/I). As described above, the CORDIC may be disposed in the signal identification circuit 400, or within the lower power network interface 23.

Thus, the window contains (window duration*bit rate*OSR) data points, where OSR is the oversample rate.

By determining the phase difference between two adjacent points, frequency can be obtained. In other words, the frequency of point N is given by (Phase (N)-Phase (N−1))/oversample time, where oversample time is the reciprocal of oversample rate. This frequency is saved as a data point. In certain embodiments, this calculation is performed in the network interface 23 so that the signal identification circuit 400 receives a plurality of data points, where each data point is indicative of a frequency value. In other words, the value of the data point is representative of the frequency of the signal at that point. For example, for BLE2 and Zigbee, 500 kHz may be represented as a nominal value, such as 50. Other frequencies are scaled based on this relationship. For BLE1, 250 kHz may be represented as the nominal value.

Alternatively, the frequency of the incoming signal may be determined by the signal identification circuit 400.

In both embodiments, the window comprises a plurality of data points, where each data point is indicative of a frequency value. This window is then processed, as shown in Box 520.

In certain embodiments, any frequency offset is subtracted from these frequency values. Removing the frequency offset may allow better analysis of the incoming signal. This may be done by calculating the average positive frequency of all of the data points having a positive value, calculating the average negative frequency of all of the data points having a negative value, and then taking the average of the average positive frequency and the average negative frequency. This average value may be referred to as the frequency offset. This average value may then be subtracted from all of the data points in the window.

Having processed the data points in the window, the signal identification circuit 400 may then check for noise, as shown in Box 530. Noise can then be determined in several ways. For example, if the frequency value of a data point is outside a predetermined range, this may be indicative of noise. For example, Zigbee and BLE utilize 2 FSK (2 Frequency Shift Keying), which modulates the carrier frequency (Fc) by a deviation frequency (Fd), resulting in signals with frequencies between Fc−Fd and Fc+Fd. After filtering and processing, the data points in the window should have values that correspond roughly to frequencies between −Fd and +Fd.

Figure 10:
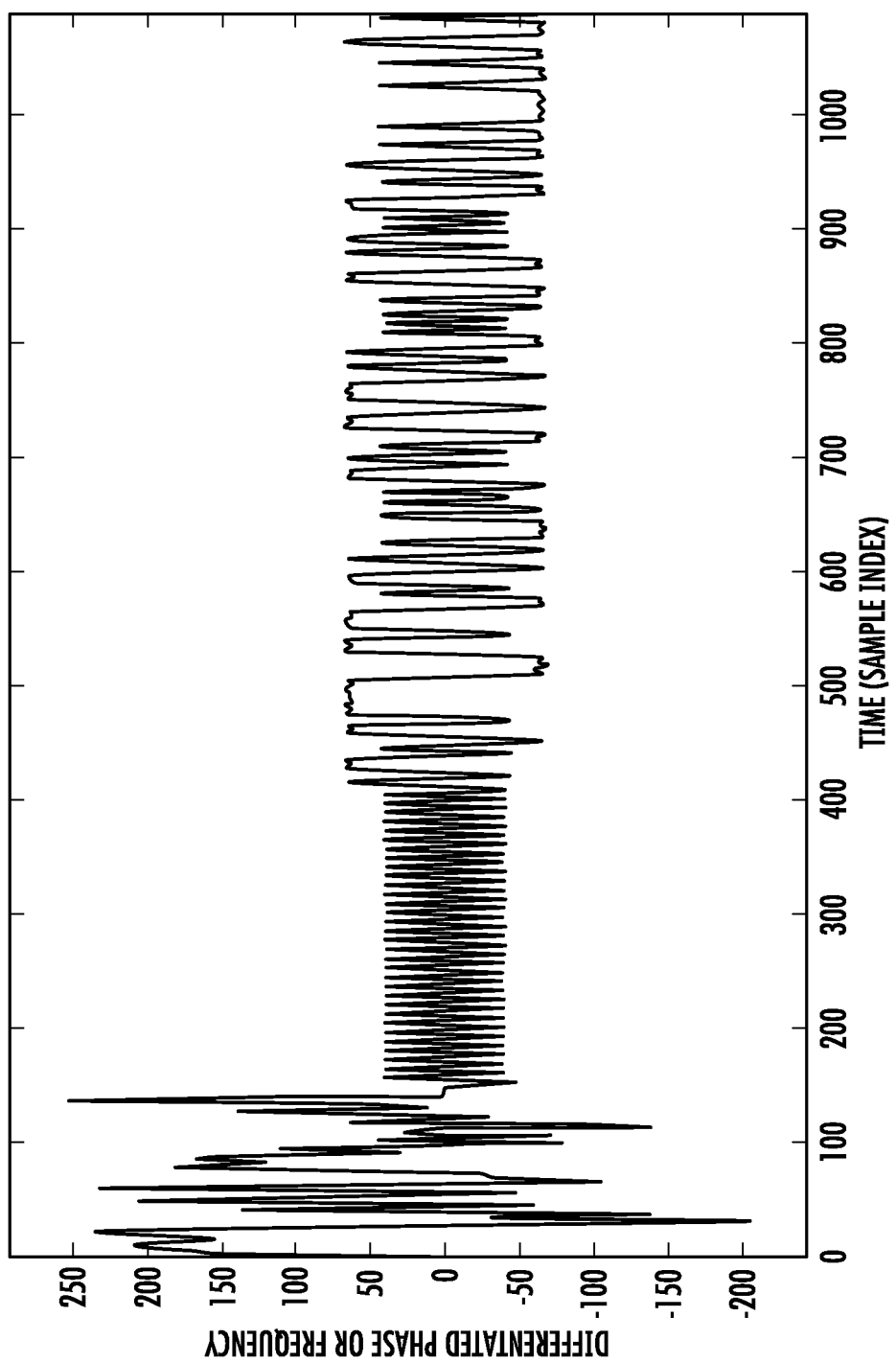
FIG. 10 shows a sample of the data points.

FIG. 10 shows the data points after processing and filtering. For illustrative purposes, FIG. 10 shows more than one window of data. The vertical axis represents values that are indicative of frequency. In this graph, the number 50 is used to represent +Fd and −50 represents −Fd. In this graph, the first 150 samples are noise and have frequency values well in excess of +Fd and −Fd. In fact, these values are in excess of +100 and −100 (in other words, more than twice +Fd and −Fd). Following this is a preamble, which extends from roughly 150 to 400. During the preamble, the data points oscillate between roughly +Fd and −Fd for a period of time (i.e. a pattern of 10101010). After the preamble are the sync character and the data, which have lower frequency content than the preamble. Consequently, these fields may not be as heavily filtered as the preamble and therefore appear to have a frequency which is slightly greater than +Fd and slight less than −Fd. This is the reason that the signal identification circuit 400 incorporates a margin for noise detection.

Thus, if the data points have values that indicate frequencies well above +Fd or well below −Fd, this may be indicative of noise. In certain embodiments, the signal identification circuit 400 allows some amount of margin, such as 100%, such that frequency outliers are those frequency values that are greater than twice +Fd or less than twice −Fd. This amount of margin, which may be programmable, is denoted as max_margin. If the max_margin is a value greater than 1, then each point having with a frequency above max_margin*+Fd or below max_margin*−Fd may be referred to as a frequency outlier.

Additionally, BLE and Zigbee have a minimum data bit duration. For example, BLE1 has a bit rate of 1 Mbps, while BLE 2 and Zigbee have a bit rate of 2 Mbps. A bit is represented by a string of consecutive data points having the same or substantially the same frequency. Rapid changes in frequency, especially from positive frequencies to negative frequencies or vice versa, may be referred to as transients. In other embodiments, a transient is represented as a transition from a positive value to a negative value, or vice versa. This is commonly referred to as a zero-crossing. Thus, if the duration of transients in the incoming signal is less than the minimum bit duration, this may be indicative of noise. Likewise, if the number of zero-crossings exceeds a predetermined threshold, this may be indicative of noise. Zero-crossings contained within a window can be calculated by comparing the sign of each data point with its adjacent data point in the window. The number of differences that result from this operation is indicative of the number of zero-crossings.

Thus, in one embodiment, if the frequency range is outside expected values, the bit duration of the incoming signal is less than the expected values, and/or the number of zero-crossings is too large, the incoming signal may represent noise. Throughout this specification, the term "noise" may be used to indicate any signal that is not a Bluetooth or Zigbee signal. This includes background noise and WiFi signals.

In one embodiment, during the first stage, the signal identification circuit 400 counts the number of frequency outliers in the window and compares this number to a predetermined threshold. If the number of frequency outliers is less than the predetermined threshold, the signal identification circuit 400 determines that this window may represent a BLE1, BLE2 or Zigbee signal. In this case, the signal identification circuit 400 saves this window for further analysis by the second stage, as shown in Box 540. Specifically, the window is stored in the data buffer.

Alternatively, the signal identification circuit 400 may use a different metric to determine whether the window contains noise, such as counting transients, counting zero-crossings or another technique.

The signal identification circuit 400 then checks whether the window count is equal to a predetermined upper window limit, as shown in Box 550. This predetermined upper window limit may be related to the size of the window and the duration of the interframe spacing. For example, if the interframe spacing is 32 µseconds, and each window is 4 µseconds in duration, the upper window limit may be set to 8. For BLE1, the window may be set to 8 µseconds. In this embodiment, the upper window limit may be set to 4. If the window count is less than the upper window limit, the window count is incremented, as shown in Box 560 and the signal identification circuit 400 returns to Box 510.

If the window count has reached the upper window limit, the signal identification circuit 400 then executes the second stage, as shown in Box 570.

Returning to Box 530, if the signal identification circuit 400 determines that the window is noise, it moves to Box 580. The signal identification circuit 400 then checks whether the number of consecutive noiseless windows is greater than or equal to a predetermined lower window limit. In certain embodiments, the lower window limit may be related to the interframe spacing. For example, in certain embodiments, the lower window limit is set to a value such that the total time of the consecutive noiseless windows is at least one half of the interframe spacing. For example, if the interframe spacing is 32 µseconds, and each window is 4 µseconds in duration, the lower window limit may be set to 4. For BLE1, the window may be set to 8 µseconds. In this embodiment, the lower window limit may be set to 2. If the window count is less than the lower window limit, the data buffer is reset, as shown in Box 590. This is because the minimum amount of consecutive noiseless windows was not reached. The signal identification circuit 400 then returns to Box 500 and resets the window count.

If the window count is equal to or is greater than the lower window limit, the signal identification circuit 400 executes the second stage, as shown in Box 570. If the window count is less than the lower window limit, the second stage is not executed.

Figure 6:
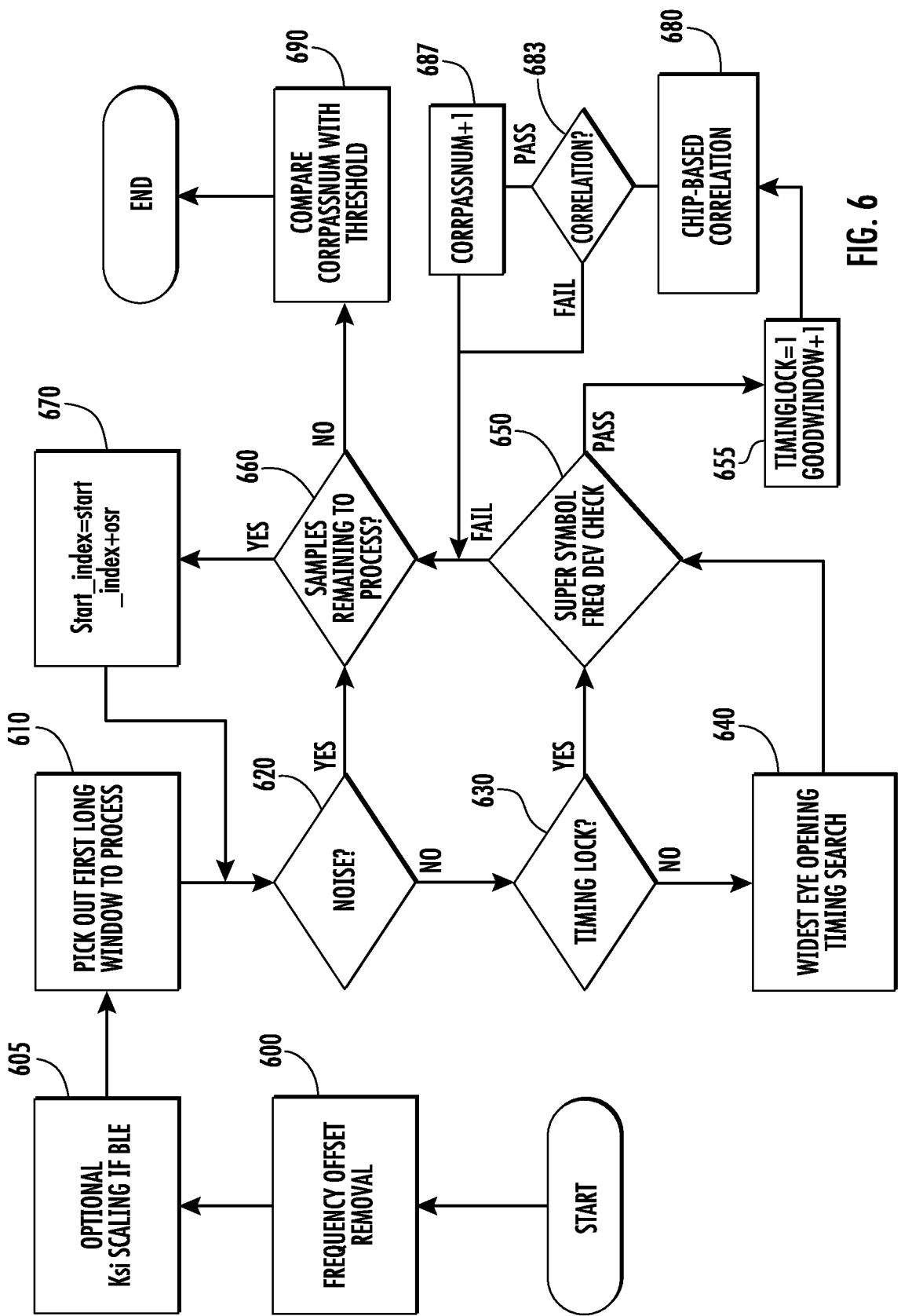
FIG. 6 is a representative flowchart of the second stage of the signal identification circuit.

FIG. 6 shows a representative flowchart showing the operation of the second stage that is executed by the signal identification circuit 400.

As described above, in one embodiment, the second stage is only entered if the number of consecutive noiseless windows detected by the first stage is at least equal to a predetermined lower limit. The input to the second stage is the data buffer created by the first stage. This data buffer may contain a plurality of windows, between the lower limit and upper limit. For example, for BLE2 and Zigbee embodiments, there may be between 4 and 8 windows contained in the data buffer. For BLE1, there may be between 2 and 4 windows contained in the data buffer. Of course, the upper and lower limits may be different than those described above. As noted above, each data point in the data buffer represents a frequency.

More specifically, if the windows are 4 µseconds for BLE2 and Zigbee, each window may contain 32 (4× oversampling) or 40 (5× oversampling) samples. Thus, for 4× oversampling, the data buffer may contain between 128 and 256 samples. For 5× oversampling, the data buffer may contain between 160 and 320 samples. In other words, the data buffer contains between (window duration*bit rate*OSR*lower window limit) and (window duration*bit rate*OSR*upper window limit).

In another embodiment, the signal identification circuit 400 may only execute the second stage. Thus, it collects the data points from the lower power network interface and places this data in a data buffer.

To simplify processing, the signal identification circuit 400 may remove the frequency offset from all data points in the data buffer, as shown in Box 600. This may be done by calculating the average positive frequency of all the data points in the data buffer having a positive value, calculating the average negative frequency of all of the data points having a negative value, and then taking the average of the average positive frequency and the average negative frequency. This average value is then subtracted from all of the data points. In another embodiment, the signal identification circuit 400 uses the frequency offset values that were determined for each window by the first stage. The signal identification circuit 400 may simply average the frequency offset values from the first stage to obtain the overall frequency offset. Of course, other methods may be used to define the frequency offset and subtract this value from all data points in the data buffer.

Next, optionally, as shown in Box 605, if the signal identification circuit 400 is checking for BLE signals, the data points may be scaled. Because of the frequency and bandwidth of BLE, at high data rates, such as alternating values of 1 and 0, the frequency may not reach its intended value. Specifically, because of the nature of Gaussian frequency shift keying, the actual frequency deviations may be less than theoretical. Thus, in certain embodiments, the signal identification circuit 400 compensates for this using a scale factor. Examples of these frequency deviations can be seen in FIG. 10, where the preamble shows a smaller frequency value than the random data that follows it.

While, FIG. 6 shows the scaling performed immediately after the frequency offset is removed, other embodiments are possible. For example, Box 605 may only be performed prior to Box 640, only prior to Box 650 or at some other point in this sequence.

Next, the signal identification circuit 400 selects the first long window for processing, as shown in Box 610. A long window is defined as a plurality of consecutive noiseless windows, as determined by the first stage. In one embodiment, a long window may comprise 4 consecutive noiseless windows. In other embodiments, a different value may be used. Indeed, the long window need not be an integer multiple of windows. The first long window starts with the earliest received data point. As the process continues, the long window slides along the data buffer, dropping the earlier data points from one end of the long window and adding newer data points to the other end of the long window. For example, the long window may contain 128 bits (assuming an OSR of 4). When the process begins, the earliest 128 data points are selected. During the next iteration of the process, the 4 earliest data points are dropped and 4 new data points (i.e. the first 4 bits that arrived after the first 128 data points). In other words, the long window slides along the data buffer, sliding by OSR data points each time.

The signal identification circuit 400 then checks the long window for noise, as shown in Box 620. This may be done using any of the noise algorithms described above with respect to the first stage. For example, the signal identification circuit 400 may count the number of frequency outliers and compare this to a predetermined threshold. The signal identification circuit 400 may count the number of zero-crossings and compare this to a predetermined threshold. The signal identification circuit 400 may measure the bit duration of the incoming signal. Alternatively, the signal identification circuit 400 may perform more than one of these tests.

If the signal identification circuit 400 determines that the long window does not contain noise, it then checks whether there is a timing lock, as shown in Box 630. As described above, the incoming signal is oversampled, such as 5 samples per bit. One of these 5 samples best represents the actual value of the bit. The process to determine which of these samples is best is referred to as the timing lock. This process is performed in Box 640. Therefore, the first time that the signal identification circuit 400 reaches Box 630, the test will necessarily fail and move to Box 640.

In Box 640, the signal identification circuit 400 performs a widest eye opening timing search. As stated above, the incoming data signal is oversampled. Assume that the incoming data signal is oversampled by a factor of 5, thus the oversample rate (OSR) is 5 and the incoming data signal is sampled at a frequency that is OSR multiplied by bit rate (BR). The data points are then placed in bins, where the number of bins is a multiple of the OSR. For example, there may be 10 bins (i.e. 2*OSR), where the first data point is placed in the first bin, the second data point is placed in the second bin, and so on. Stated differently, the bin in which data point N is placed is defined as modulo(N, 2*OSR). The results of this procedure are shown in graphical form in FIG. 7. Again, the frequency offset has been removed from the graph of FIG. 7.

Figure 7:
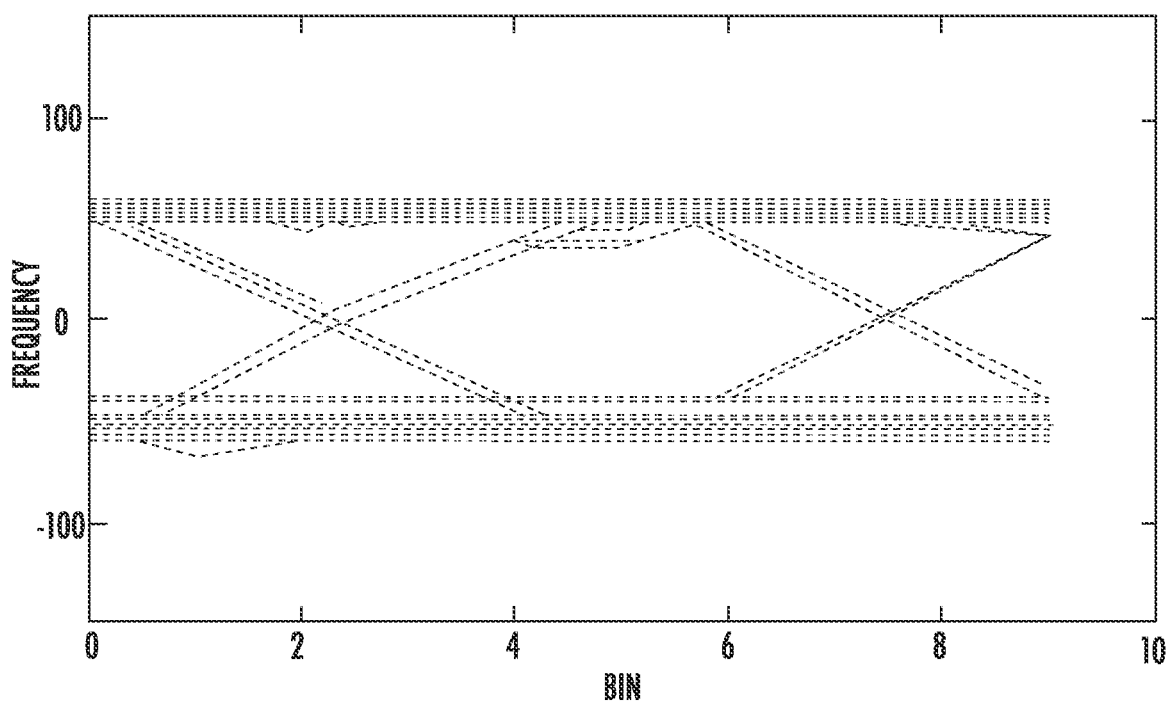
FIG. 7 shows the operation of the widest eye opening timing search.

Note that FIG. 7 shows two horizontal lines, which represent the frequencies, +Fd and −Fd, respectively. There are also several crossing points. These crossing points may be indicative of when the incoming data signal transitions from one value to the other. In other words, the crossing points are at the edges of the data bit. As stated above, the incoming data is oversampled at a rate of OSR multiplied by BR. The incoming data may be recovered using a clock that operates at the BR frequency. Thus, it may be useful to determine the optimal phase of that recovery clock. In one embodiment, the crossing points indicate transitions in the data bits, so the phase of the recovery clock is configured to be between two crossing points. Note that in FIG. 7, the crossing points occur at approximately values of 2.5 and 7.5. Thus, the recovery clock may start sampling at a value of 5, which is between the two crossing points. Note that at a value of 5, most data points are either at +Fd or −Fd. Thus, the data is sampled at a frequency of BR, where the optimal phase offset is determined by the optimal value derived above. This gives a high likelihood of successfully recovering the incoming data. Once the initial phase is determined, the signal identification circuit 400 samples every $5^{th}$ data point (or $4^{th}$ depending on the value of the OSR).

Of course, other methods of recovering the incoming data may also be used. For example, in another embodiment, the signal identification circuit 400 may obtain the difference between the average positive values and the average negative values for each bin. The bin with the greatest difference may be used as the phase of the recovery clock. In yet another embodiment, rather than plotting the frequency signals in FIG. 7, the absolute values of those frequency values within each bin are averaged. The bin which has the highest average value may be used as the phase of the recovery clock. In yet other embodiments, it may not be necessary to create the graph shown in FIG. 7.

Note that in certain embodiments, there may be frequency outliers in the long window. If these frequency outliers are used to create the bins described above, their values may alter the results. Thus, in certain embodiments, the frequency outliers are removed. In one embodiment, the positive frequency outliers are replaced with the typical positive frequency deviation (such as the number 50) and the negative frequency outliers are replaced with the typical negative frequency deviation (such as the number −50). In another embodiment, the frequency outliers may be removed completely from the calculation of the optimal bin and phase.

In one embodiment, the output of Box 640 may be a buffer containing 32 bits of data. In other words, assume the window is defined as 4 μseconds for BLE2 and Zigbee, and 8 μseconds for BLE1. This implies that each window contains 8 bits of data. If the long window contains 4 windows, then the output of Box 640 will be 32 bits of data with optimal timing. These bits may be referred to as the optimized data buffer.

Once the timing search has been completed, the signal identification circuit 400 than performs a super symbol frequency deviation check, as shown in Box 650. As described above, after the timing search has been completed, the data points in the long window are sampled using the phase identified in Box 640 to create the optimized data buffer. Therefore, if the correct phase has been selected, all of the data points in the optimized data buffer should have a frequency value that represents either +/−Fd (with some tolerance). Thus, the signal identification circuit 400 may count the number of data points in the optimized data buffer that are not within the expected ranges.

For example, the super symbol frequency deviation check may count the number of data points that are not within a range that is +/−20% of +Fd or +/−20% of −Fd. In one embodiment, the signal identification circuit 400 may utilize a margin value, that may be programmed. This margin value may be any suitable value, such as 20%. The number of data points that do not fall within this range are counted.

If the number of data points in the optimized data buffer that are not within the expected frequency ranges exceeds a predetermined limit, it is assumed that timing lock was not achieved. The signal identification circuit 400 then moves to Box 660, where it checks whether there are still additional samples to process. Specifically, as noted above, the long window may be defined as four windows. If the buffer contains exactly four windows of data points, there are no more samples to process. However, if the buffer contains more than four windows of data points, then there will be additional samples to process. If there are additional samples to process, the signal identification circuit 400 moves to Box 670. In this Box, the signal identification circuit 400 indexes into the buffer by moving over exactly one bit. As described above, the data buffer contains OSR samples for each bit, thus by incrementing the index by OSR bits, the signal identifier is indexing exactly one bit over in the long window. The signal identification circuit 400 then repeats the processes described above.

Returning to Box 650, if, on the other hand, the number of data points in the optimized data buffer that are not within the expected frequency ranges is less that the predetermined limit, the signal identification circuit 400 indicates that timing lock has been achieved, as shown in Box 655. In one embodiment, once timing lock has been achieved, the widest eye opening timing search (Box 640) is not executed again. However, in another embodiment, the widest eye opening timing search (Box 640) is always performed if there is no noise. In this embodiment, Box 630 may be deleted. Additionally, as shown in Box 655, the signal identification circuit 400 may increment a variable, referred to GoodWindow. This variable is incremented every time a window is determined not to be noise and the window passes the super symbol frequency deviation check at Box 650.

Further, once timing lock has been achieved, the signal identification circuit 400 then determines whether the data points in the optimized data buffer represent Zigbee data or BLE data.

As stated earlier, Zigbee utilize OQPSK with DSSS (Direct Sequence Spread Spectrum), while BLE does not. Thus, by determining whether the incoming data utilizes the chip sequences specified by OQPSK with DSSS, it can be determined that the incoming data represents a Zigbee packet. Conversely, if the incoming data does not utilize the chip sequences specified by OQPSK with DSSS, it can be determined that the incoming data represents a BLE packet. As described in more detail below, this correlation only occurs when the signal identification circuit 400 is configured to identify Zigbee or BLE2

The Zigbee protocol utilizes sixteen distinct chip sequences, shown in FIG. 8. These are the only allowable patterns of data that OQPSK with DSSS supports. In contrast, BLE is not OQPSK with DSSS, and therefore allows any pattern of data. Thus, if the optimized data buffer correlates to any one of these 16 patterns, also referred to as chip sequences, the incoming data is likely Zigbee. If the incoming data does not correlate to one of these 16 chip sequences, it is most likely BLE2. Thus, in Box 680, the signal identification circuit 400 performs chip-based correlation.

In one embodiment, the signal identification circuit 400 comprises one or more 32-bit comparators that are used to compare the incoming data to each of the 16 possible chip sequences. In certain embodiments, the output of the comparators is a value between 0 and 32, which indicates the number of bits that matched that particular chip sequence. If the output is greater than a certain threshold, it is determined that there is a match between the incoming data and that chip sequence. This indicates that the incoming data is most likely a Zigbee packet. In another embodiment, signal identification circuit 400 comprises a correlator that assigns a weight value to each bit in the expected sequence. This weight value is multiplied by the frequency value of the respective incoming data bit and then summed with other respective products. For example, a chip sequence may be represented by 1101. In this case, the correlator assigned the weight values 1, 1, −1 and 1, respectively. Thus, if the incoming data bits are the expected chip sequence, their frequency values may be 50, 50, −50 and 50. When these frequency values are multiplied by the weight values, a value of 200 would be obtained. If the incoming bits represent a different sequence, the resulting sum would be less than this. Thus, a threshold can be used to determine whether an incoming sequence represents a valid Zigbee signal.

Thus, in this process, the signal identification circuit 400 compares the optimized data buffer to the different Zigbee chip sequences. The signal identification circuit 400 then checks if there is correlation, as shown in Box 683. If there is a correlation, the signal identification circuit 400 increments the number of correlations that succeeded, referred to as CorrPassNum, as shown in Box 687. In certain embodiments, the signal identification circuit 400 includes a programmable threshold to indicate how many of the 32 bits must match before a correlation is detected.

If there is no match, the variable CorrPassNum is not incremented. The signal identification circuit 400 then proceeds to Box 660 to check if there are more samples to process.

If there are no additional samples, the signal identification circuit 400 proceeds to Box 690. Several tests are performed in this process. First, the CorrPassNmum variable is compared against a threshold. If the CorrPassNum variable is greater than this threshold, the signal identification circuit 400 concludes that a Zigbee packet was being transmitted. If, on the other hand, the CorrPassNum is less than the threshold, it is possible that that a Bluetooth packet was being transmitted. The signal identification circuit 400 then compares the GoodWindow variable against a threshold. If the GoodWindow variable is greater than this threshold, it is concluded that a BLE packet is being transmitted. If the timing lock is not achieved or the value of GoodWindow is less than the threshold, the signal identification circuit 400 concludes that neither a BLE nor Zigbee packet was being transmitted.

In certain embodiments, there may be modifications to the flowchart of FIG. 6. For example, in certain embodiments, the threshold associated with CorPassNum may be 1. In this case, if a correlation is found in Box 683, the signal identification circuit 400 may immediately indicate that a Zigbee packet has been detected. Thus, in this embodiment, the signal identification circuit 400 may transition from Box 683 directly to Box 690.

Similarly, in certain embodiments, a BLE1 packet may be detected once the value of GoodWindow exceeds a threshold. This check may be performed in Box 660.

Having described the general flow of the signal identification circuit 400, its operation in detecting each type of packet will be detailed.

Assume that the signal identification circuit 400 is configured to detect a BLE1 packet. For BLE1, the frequency deviation (Fd) is typically about 250 kHz. Further, the OSR used for BLE1 is 4, the duration of the window is set to 8 µseconds, the lower window threshold is set to 2 and the upper window threshold is set to 4.

As shown in FIG. 5, the signal identification circuit 400 attempts to process windows. If the signal being transmitted is either BLE2 or Zigbee, its frequency deviation (Fd) will be 500 kHz. However, the data points may be scaled such that 250 kHz is represented by a nominal value (such as 50). Thus, a window that is populated with BLE2 or Zigbee data may appear to contain frequency outliers, since the frequency deviation of these protocols is twice that of BLE1. Consequently, it is unlikely that the signal identification circuit 400, configured to detect BLE1, will incorrectly identify a BLE2 or Zigbee packet as being a noiseless window. Therefore, it is unlikely that the second stage will be executed if the received packet is BLE2 or Zigbee. Further, even if the second stage is executed, it is very likely that the BLE2 or Zigbee signal will fail the super symbol frequency deviation check (Box 650), as the frequencies of the data points will not be within the expected ranges. Therefore, if the second stage is executed, it is highly unlikely that the data is actually a Zigbee packet. Therefore, in certain embodiments, when the signal identification circuit 400 is configured to detect BLE1, Box 680 is not executed. Rather, the signal identification circuit 400 may simply compare GoodWindow to a threshold and provide an indication that a BLE1 packet is being transmitted if GoodWindow exceeds this threshold. If GoodWindow does not exceed this threshold, no indication is provided by the signal identification circuit 400.

Assume that the signal identification circuit 400 is configured to detect a BLE2 packet. For BLE2, the frequency deviation (Fd) is typically about 500 kHz. Further, the OSR used for BLE1 is 4, the duration of the window is set to 4 µseconds, the lower window threshold is set to 4 and the upper window threshold is set to 8.

As shown in FIG. 5, the signal identification circuit 400 attempts to process windows. If the signal being transmitted is BLE2, its frequency deviation (Fd) will be 500 kHz. Thus, the data points may be scaled such that 500 kHz is represented by a nominal value (such as 50). If the signal being transmitted is BLE1, its frequency deviation (Fd) will be 250 kHz. Thus, a window that is populated with BLE1 data will appear to contain a frequency that is half of that which is expected. Thus, in one embodiment, the signal identification circuit 400 may determine that a window that contains a BLE1 is simply noise because its frequency content is too low. In another embodiment, the first stage of the signal identification circuit 400 may indicate that multiple noiseless windows are identified if a BLE1 packet is being transmitted and therefore proceed to the second stage. Additionally, the signal identification circuit 400 will proceed to the second stage if a Zigbee or BLE2 packet is being transmitted.

Consequently, when the signal identification circuit 400 enters the second stage, it still needs to determine whether the packet is actually BLE2, as opposed to BLE1 or Zigbee. If the packet being transmitted was actually BLE1, it will likely fail the super symbol frequency deviation check in Box 650, as its frequency deviation (Fd) is half of the expected values.

To distinguish between BLE2 and Zigbee, the signal identification circuit 400 utilizes the correlation in Box 680. If the signal identification circuit 400 processes the entirety of the long window and the value of CorrPassNum is less than a certain threshold, the signal identification circuit 400 will indicate that a BLE2 packet has been detected, assuming that the value of GoodWindow is above a second threshold. If, on the other hand, the value of CorrPassNum is greater than the threshold, the signal identification circuit 400 will not indicate that a BLE2 packet has been detected.

Assume that the signal identification circuit 400 is configured to detect a Zigbee packet. For Zigbee, the frequency deviation (Fd) is typically about 500 kHz. Further, the OSR used for Zigbee is 5, the duration of the window is set to 4 μseconds, the lower window threshold is set to 4 and the upper window threshold is set to 8.

The signal identification circuit 400 operates in the first stage in much that same manner as it does for BLE2, with the exception of the value of the OSR.

Similarly, the signal identification circuit 400 operates in the second stage in much that same manner as it does for BLE2, with the exception of the value of the OSR. Thus, as described above, if the long window contains a BLE1 packet, it will likely fail the super symbol frequency deviation check in Box 650. Further, if the signal identification circuit 400 is configured to detect Zigbee, it will indicate a Zigbee packet has been detected if the value of CorrPassNum is greater than a threshold.

The output of the signal identification circuit 400 may be used for a plurality of purposes.

In one embodiment, the signal identification circuit 400 may then use this information to control the operation of the WiFi controller.

Figure 9B:
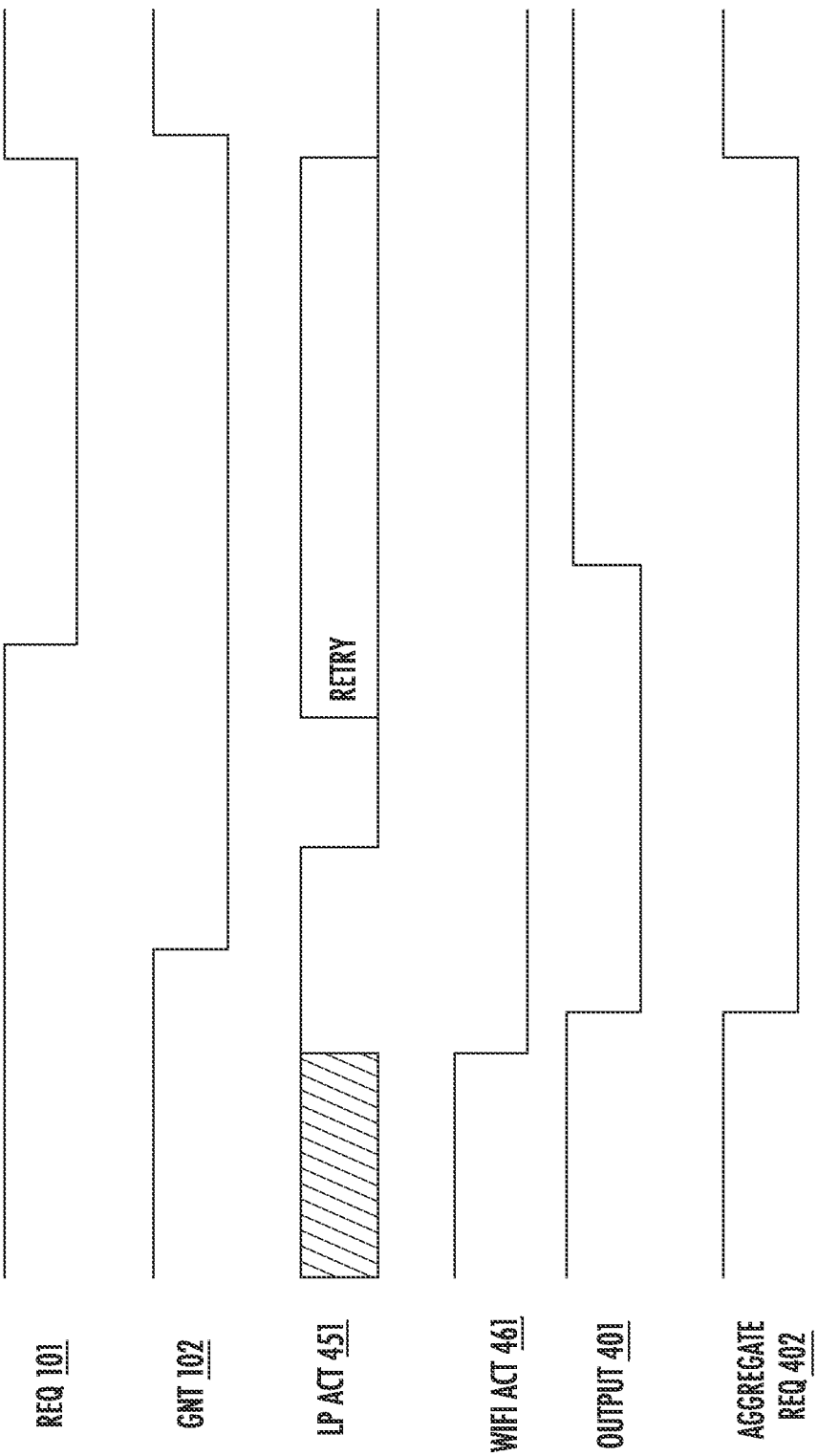

For example, if a lower-power network packet (i.e. BLE1, BLE2, or Zigbee) is detected during the interframe spacing, the signal identification circuit 400 will request access to the shared medium by asserting output 405 (see FIG. 4). When the lower-power packet is re-transmitted, the lower-power network controller 20 will be able to detect the header 310, including the preamble and sync fields, and determine whether the packet is intended for this device. If the packet is intended for this device, the lower-power network controller 20 will assert the REQ signal 101, as shown in FIG. 4. Thus, the timer 420 only needs to assert the output 401 until the header of the re-transmitted lower-power network packet is received. At this point, there are two possible scenarios. In the first scenario, the packet is not intended for this device and the WiFi controller 10 is free to start transmitting again. In this scenario, the aggregate REQ signal 402 is deasserted when the timer 420 expires. In the second scenario, the packet is intended for this device and the lower-power network controller 20 asserts the REQ signal 101. These two scenarios are shown in FIGS. 9A-9B.

In these diagrams, the REQ signal 101, the GNT signal 102, output 401 and aggregate REQ signal 402 are all active low, meaning that they are asserted when they are at the lower voltage and are inactive at the higher voltage.

The LP Signal 451 represents lower-power network activity, as detected by the signal identification circuit 400. The WiFi Act signal 461 represents WiFi network activity. This represents both incoming and outgoing packets.

In FIG. 9A, the WiFi activity (WiFi ACT Signal 461) ceases at a point in time. This may correspond to the interframe spacing. At this point, there is some type of lower-power signal (LP Signal 451) detected on the shared medium. The signal identification circuit 400 may identify this signal as the signal of interest (either BLE1, BLE2 or Zigbee) and assert the output 405 (see FIG. 4) to the timer 420. This will cause output 401 of the timer 420 to be asserted and therefore will also cause the aggregate REQ signal 402 to be asserted as well. At a later point in time, the timer 420 expires, causing the output 401 to be deasserted. The duration of the output 401 may be sufficiently long so that the lower-power packet is being retransmitted when the timer 420 expires. In this graph, the lower-power network controller 20 determines that this lower-power packet is not intended for this device. Therefore, it never asserts the REQ signal 101. Consequently, once the timer 420 expires, the aggregate REQ signal 402 is also deasserted, and the WiFi controller 10 is free to access the shared medium. The WiFi controller 10 deasserted the GNT signal 102 and may begin transmitting WiFi packets.

In FIG. 9B, the WiFi activity (WiFi ACT Signal 461) ceases at a point in time. This may correspond to the interframe spacing. At this point, there is some type of lower-power signal (LP Signal 451) detected on the shared medium. The signal identification circuit 400 may identify this signal as the signal of interest (either BLE1, BLE2 or Zigbee) and assert the output 405 (see FIG. 4) to the timer 420. This will cause output 401 of the timer 420 to be asserted and therefore will also cause the aggregate REQ signal 402 to be asserted as well. At a later point in time, the timer 420 expires, causing the output 401 to be deasserted. The duration of the output 401 may be sufficiently long so that the lower-power packet is being retransmitted when the timer 420 expires. In this graph, before the deassertion of the output 401, the lower-power network controller 20 determines that this lower-power packet is intended for this device. Therefore, it asserts the REQ signal 101. Consequently, once the timer 420 expires, the aggregate REQ signal 402 remains asserted, since the lower-power network controller 20 asserted the REQ signal 101.

Thus, in this embodiment, as shown in FIG. 4, the signal identification circuit 400 is used to detect the presence of a particular lower-power network signal on the shared medium and to assert the output 405. A timer 420 may be used to assert output 401 for a predetermined period of time. This assertion of the output 401 causes the WiFi controller 10 to relinquish control of the shared medium and allows the lower-power network controller 20 to be able to detect the lower-power packet (or its re-transmission).

In another embodiment, the output 405 of the signal identification circuit 400 may be used in conjunction with the Received Signal Strength Indicator (RSSI). In one embodiment, the output 405 of the signal identification circuit may not be used if the RSSI is too low.

As stated above, the above configuration is used to allow lower-power network traffic to be detected even in cases of high duty-cycle WiFi transmissions. In other words, in scenarios where the WiFi controller 10 is transmitting at a high duty cycle, this configuration allows for detection of lower-power network traffic. If such traffic is detected, the aggregate REQ signal 402 is asserted so that WiFi transmissions from the WiFi controller 10 are suspended so that the lower-power network packet can be retransmitted and properly detected.

In another embodiment, the signal identification circuit 400 may be used to save power consumption in the lower-power network controller 20. For example, the signal identification circuit 400 may remain powered on and configured to detect a particular lower-power network packet (i.e. BLE1, BLE2 or Zigbee). When the signal identification circuit 400 detects the particular lower-power network packet, the output 405 may be used to interrupt the processing unit 21 or power on the lower-power network controller 20. Since the signal identification circuit 400 is capable of detecting the lower-power network signal within about 16 μseconds, the lower-power network controller 20 may be able to receive the packet after the detection. In other embodiments, the lower-power network controller 20 may stay powered on to allow the receipt of the retry.

In another embodiment, the signal identification circuit 400 may be used to determine the channel that a signal is being transmitted on. If the signal identification circuit 400 is configured to receive a particular signal, within 16 μseconds, it may detect the signal. Thus, the signal identification circuit 400 may be used to quickly detect which channel a signal is being transmitted on.

In another embodiment, the output of the signal identification circuit 400 may be used to perform a clear channel assessment (CCA) in conjunction with Received Signal Strength Indicator (RSSI). For example, IEEE802.15.4 specifies four different modes of CCA. These modes are as follows. Mode 1 requires that the device report a busy medium is the energy on the medium is above a predetermined threshold. Mode 2, referred to as carrier sense only, requires that the device reports a busy medium only upon detection of a signal with the same modulation and spreading characteristics of the PHY that is in use. Mode 3 requires the combination of the two previous modes. Mode 4 states that the device always reports an idle medium. It is noted that RSSI can be used to determine energy levels. However, the carrier sense detection is not possible using RSSI. Rather, the signal identification circuit of the present disclosure may be used to perform the carrier sense test used in Modes 2 and 3.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A signal identification circuit to determine whether a wireless signal comprises a lower-power network protocol, comprising:
   a circuit configured to:
   receive a plurality of data points in a buffer, wherein each data point represents a frequency value;
   select a first group of the plurality of data points from the buffer, referred to as a long window;
   determine whether a lower-power network signal is present in the long window based on the frequency value of each data point;
   if the lower-power network signal is present, perform a timing lock on the long window to create an optimized data buffer and a super symbol frequency deviation check on the optimized data buffer;
   wherein, based on results of the timing lock and the super symbol frequency deviation, the circuit determines whether the lower-power network protocol is present.

2. The signal identification circuit of claim 1, wherein the super symbol frequency deviation check is performed a plurality of times, and wherein the circuit selects a new group from the buffer to create a new long window, wherein the new group comprises removing one or more earliest received data points and adding an equal number of more recently received data points.

3. The signal identification circuit of claim 1, wherein performing the timing lock comprises:
   determining an optimal phase of a bit clock that best represents actual transmitted bits; and
   sampling the window using the optimal phase to create the optimized data buffer.

4. The signal identification circuit of claim 3, wherein the optimal phase is determined by separating the data points into a plurality of bins, and wherein one bin is selected as the optimal phase.

5. The signal identification circuit of claim 4, wherein the bin with a greatest difference between average positive frequency values and average negative frequency values determines the optimal phase.

6. The signal identification circuit of claim 4, wherein the bin with a greatest sum of absolute values of all data points determines the optimal phase.

7. The signal identification circuit of claim 4, wherein data points having a frequency outside an expected range are referred to as frequency outliers, wherein the expected range is based on a frequency deviation used by the lower-power network protocol and frequency outliers are modified prior to a selection of the optimal phase.

8. The signal identification circuit of claim 1, wherein performing a super symbol frequency deviation check on the optimized data buffer comprises:
   counting a number of bits in the optimized data buffer that are not within a predetermined range of values, wherein expected values are based on a frequency deviation used by the lower-power network protocol and the predetermined range of value is defined as the expected values+/−a margin, wherein the margin is a programmable value; and
   indicating success if the number of bits is less than a threshold.

9. The signal identification circuit of claim 1, further comprising performing a Zigbee chip correlation if the circuit determines the lower-power network protocol is present.

10. The signal identification circuit of claim 9, wherein performing a Zigbee chip correlation comprises:

comparing the optimized data buffer to valid Zigbee chip sequences; and incrementing a counter if a correlation is found.

11. The signal identification circuit of claim 9, wherein the lower-power network protocol is selected from the group consisting of Zigbee, BLE at 2 Mbps and BLE at 1 Mbps.

12. The signal identification circuit of claim 1, wherein determining whether a lower-power network signal is present in the long window based on the frequency value of each data point, comprises:

counting a number of data points having a frequency outside an expected range are referred to as frequency outliers, wherein the expected range is based on a frequency deviation used by the lower-power network protocol, and if the number is less than a predetermined value, indicating that a lower-power network signal is present.

13. The signal identification circuit of claim 1, wherein determining whether a lower-power network signal is present in the long window based on the frequency value of each data point, comprises:

counting a number of data points having a frequency value having an opposite sign as an adjacent data point, referred to as zero-crossings, and if a number of zero-crossings is less than a predetermined value, indicating that a lower-power network signal is present.

14. The signal identification circuit of claim 1, further comprising an additional circuit, wherein the additional circuit comprises a first stage of the signal identification circuit and the circuit comprises a second stage, and where the circuit only performs the timing lock and the super symbol frequency deviation check if the first stage determines the wireless signal may be a lower-power network protocol.

15. The signal identification circuit of claim 14, wherein the first stage is configured to:

collect a first plurality of data points, referred to as a window;

determine whether a lower-power network signal is present in the window based on the frequency value of each data point;

if so:

save the plurality of data points in the window in the buffer;

increment a window counter; and repeat the collect and determine steps until the window counter is greater than a predetermined upper limit;

if not:

determine if the window counter is greater to a predetermined lower limit; and if so, execute the second stage; and if not:

reset the window counter;

clear the buffer; and repeat the collect and determine steps.

16. A system comprising:

a WiFi controller, comprising an aggregate request signal used as an input to request exclusive access to a shared medium and a grant signal used as an output indicating that the exclusive access to the shared medium has been granted;

a lower-power network controller, comprising a processing unit and an associated memory element, wherein the lower-power network controller is configured to assert a request signal if an incoming lower-power network packet is destined for this controller or if an outgoing lower-power network packet is to be transmitted; and the signal identification circuit of claim 1, wherein the signal identification circuit is used to request access to the shared medium from the WiFi controller.

17. A method of determining whether a wireless signal comprises a lower-power network protocol, comprising:

performing a first stage, wherein the first stage comprises:

collecting a first plurality of data points, referred to as a window;

determining whether a lower-power network signal is present in the window based on a frequency value of each data point;

if so:

saving the plurality of data points in the window in a buffer;

incrementing a window counter; and repeating the collecting and determining steps until the window counter is greater than a predetermined upper limit;

if not:

determining if the window counter is greater to a predetermined lower limit; and if so, executing a second stage; and if not:

resetting the window counter;

clearing the buffer; and repeating the collecting and determining steps; and wherein the second stage comprises:

selecting a first group of the plurality of data points from the buffer, referred to as a long window;

determining whether a lower-power network signal is present in the long window based on the frequency value of each data point;

if the lower-power network signal is present, performing a timing lock on the data points in the long window to create an optimized data buffer;

performing a super symbol frequency deviation check on the optimized data buffer;

and, based on results of the timing lock and the super symbol frequency deviation check, determining whether the lower-power network protocol is present.

18. The method of claim 17, wherein performing the timing lock comprises:

determining an optimal phase of a bit clock that best represents actual transmitted bits; and sampling the data points in the long window using the optimal phase to create the optimized data buffer.

19. The method of claim 18, wherein the optimal phase is determined by separating the data points into a plurality of bins, and wherein one bin is selected as the optimal phase.

20. The method of claim 17, wherein performing a super symbol frequency deviation check on the optimized data buffer comprises:

counting a number of bits in the optimized data buffer that are not within a predetermined range of values, wherein expected values are based on a frequency deviation used by the lower-power network protocol and the predetermined range of values is defined as the expected values+/−a margin, wherein the margin is a programmable value; and indicating success if the number of bits is less than a threshold.

21. The method of claim 17, further comprising performing a Zigbee chip correlation if the circuit determines the lower-power network protocol is present.

22. The method of claim 21, wherein performing a Zigbee chip correlation comprises:
   comparing the optimized data buffer to valid Zigbee chip sequences; and
   incrementing a counter if a correlation is found.

* * * * *